US008463531B2

(12) United States Patent
Ramappan et al.

(10) Patent No.: US 8,463,531 B2
(45) Date of Patent: Jun. 11, 2013

(54) SYSTEM AND METHOD FOR CONTROLLING EXHAUST GAS RECIRCULATION SYSTEMS

(75) Inventors: Vijay Ramappan, Novi, MI (US); Jun-Mo Kang, Ann Arbor, MI (US); Hanho Yun, Oakland Township, MI (US); Chen-Fang Chang, Troy, MI (US)

(73) Assignee: GM Global Technology Operations LLC

( * ) Notice: Subject to any disclaimer, the term of this patent is extended or adjusted under 35 U.S.C. 154(b) by 472 days.

(21) Appl. No.: 12/791,406

(22) Filed: Jun. 1, 2010

(65) Prior Publication Data

US 2011/0290224 A1    Dec. 1, 2011

(51) Int. Cl.
*F02M 25/07* (2006.01)
*F02B 47/08* (2006.01)

(52) U.S. Cl.
USPC ...................................... 701/108; 123/568.21

(58) Field of Classification Search
USPC ............................ 123/568.21; 701/103, 108
See application file for complete search history.

(56) References Cited

U.S. PATENT DOCUMENTS

| 6,378,515 B1* | 4/2002 | Geyer ........................... 123/683 |
| 6,810,668 B2* | 11/2004 | Nagatani et al. ................ 60/615 |
| 7,231,905 B1* | 6/2007 | Haskara et al. ............... 123/435 |
| 2011/0088674 A1* | 4/2011 | Shutty et al. ............. 123/568.21 |
| 2011/0288747 A1* | 11/2011 | Wermuth et al. ............. 701/103 |

FOREIGN PATENT DOCUMENTS

| AT | 6753 U1 | 3/2004 |
| DE | 10162970 A1 | 9/2003 |

OTHER PUBLICATIONS

DE Patent Application 10 2011 102 556.5 dated Mar. 21, 2012, 7 pages.

* cited by examiner

*Primary Examiner* — Hai Huynh

(57) ABSTRACT

A control system for an engine includes a feedback determination module, a feed-forward determination module, and a valve control module. The feedback determination module generates an exhaust gas recirculation (EGR) feedback value based on engine speed and a difference between desired and measured combustion phasing. The feed-forward determination module generates an EGR feed-forward value based on a difference between desired and measured mass air flow (MAF) rates. The valve control module controls an EGR valve based on the EGR feedback and feed-forward values, an intake manifold absolute pressure (MAP), an engine speed, and an exhaust back pressure (EBP).

20 Claims, 5 Drawing Sheets

SYSTEM AND METHOD FOR CONTROLLING EXHAUST GAS RECIRCULATION SYSTEMS

FIELD

The present disclosure relates to internal combustion engines and more particularly to a system and method for controlling exhaust gas recirculation (EGR) systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines draw air into an intake manifold through an intake system that may be regulated by a throttle. The air may be distributed to a plurality of cylinders and combined with fuel from a plurality of fuel injectors to create an air/fuel (A/F) mixture. The A/F mixture may be combusted within the cylinders to drive pistons that rotatably turn a crankshaft generating drive torque.

Exhaust gas produced by combustion of the A/F mixture may be introduced into the intake manifold via an exhaust gas recirculation (EGR) system. Homogeneous charge compression ignition (HCCI) engine systems may implement EGR systems to provide for additional control of a ratio of the A/F mixture and/or combustion phasing (e.g., via temperature of the A/F mixture).

SUMMARY

A control system for an engine includes a feedback determination module, a feed-forward determination module, and a valve control module. The feedback determination module generates an exhaust gas recirculation (EGR) feedback value based on engine speed and a difference between desired and measured combustion phasing. The feed-forward determination module generates an EGR feed-forward value based on a difference between desired and measured mass air flow (MAF) rates. The valve control module controls an EGR valve based on the EGR feedback and feed-forward values, an intake manifold absolute pressure (MAP), an engine speed, and an exhaust back pressure (EBP).

A method for controlling an engine includes generating an exhaust gas recirculation (EGR) feedback value based on engine speed and a difference between desired and measured combustion phasing, generating an EGR feed-forward value based on a difference between desired and measured mass air flow (MAF) rates, and controlling an EGR valve based on the EGR feedback and feed-forward values, an intake manifold absolute pressure (MAP), an engine speed, and an exhaust back pressure (EBP).

In still other features, the systems and methods described above are implemented by a computer program executed by one or more processors. The computer program can reside on a tangible computer readable medium such as but not limited to memory, nonvolatile data storage, and/or other suitable tangible storage mediums.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
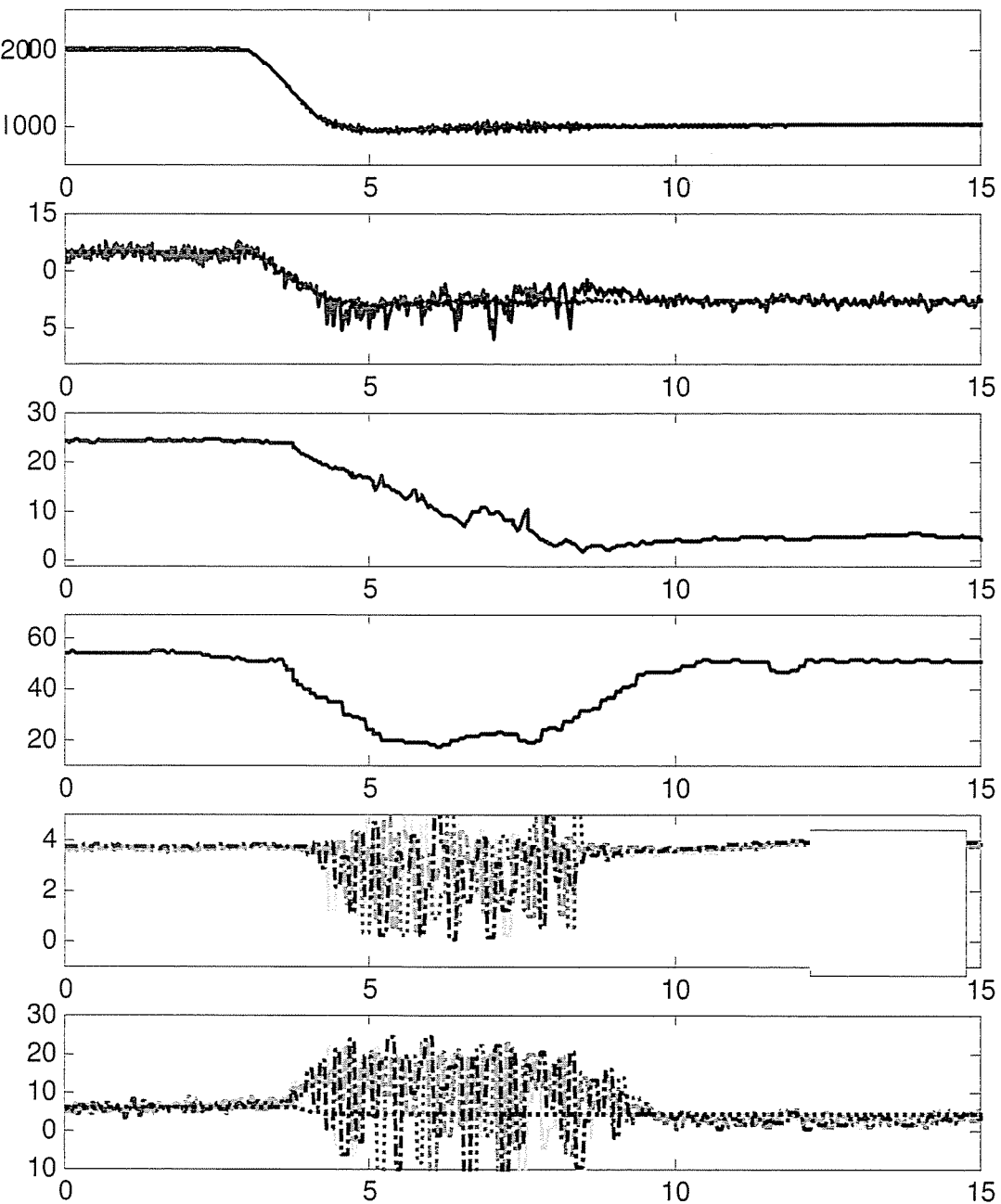
FIG. 1 is graphs illustrating engine event-based control (i.e., combustion event-based control) of exhaust gas recirculation (EGR) while an engine is operating in a homogeneous charge compression ignition (HCCI) combustion mode.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Homogeneous charge compression ignition (HCCI) engines may operate in a plurality of modes. Mixed-HCCI combustion includes compressing an air/fuel (A/F) mixture within cylinders until the A/F mixture reaches a critical pressure and/or temperature and automatically combusts. Combustion of the A/F mixture during mixed-HCCI combustion, however, may also be "assisted" by spark via spark plugs. Spark ignition (SI) combustion, on the other hand, includes compressing the A/F mixture within the cylinders and igniting the compressed A/F mixture via spark from the spark plugs.

An exhaust gas recirculation (EGR) system may be implemented to further control a ratio of the A/F mixture and/or combustion phasing. More specifically, combustion phasing may refer to a relative timing (e.g., in crank angle degrees, or CAD) at which the A/F mixture combusts within the cylinder. Thus, EGR systems may require feedback measurements of combustion phasing. Feedback control for EGR systems (e.g., an EGR valve) operates on an engine event basis (i.e., once per combustion cycle). Event-based feedback control systems, therefore, may adjust the position of the EGR valve too slowly resulting in combustion problems (e.g., misfires) due to incorrect amounts of EGR. For example, transient operations such as a rapid change in engine speed may result in a misfire.

FIG. 1 illustrates combustion problems (e.g., misfires) resulting from a rapid change in engine speed during HCCI combustion. Specifically, six graphs are shown with respect to time (seconds, or s) and from top to bottom represent: engine speed (revolutions per minute, or RPM), desired MAF rate (grams per second, or g/s), EGR valve position (opening %), negative valve overlap (NVO, in CAD), indicated mean effective pressure (IMEP, in barometric pressure, or Bar), and a retarded crank angle where a predetermined amount of the heat generated during combustion has been released (e.g., 50 percent, referred to as "CA50," in degrees after top-dead-center, or °ATDC), respectively. More specifically, the engine speed rapidly decreases from approximately 2000 RPM to approximately 1000 RPM. Accordingly, both the MAF rate and the EGR valve position decrease. The change in EGR valve position, however, is delayed compared to the engine speed decrease. The delayed change in EGR valve position results in decrement of NVO and thus combustion problems due to cold cylinder charge temperature as shown by the variation in both IMEP of the cylinders and CA50.

Accordingly, a system and method are presented for improved response of an EGR system during rapid changes in engine speed. Rather, the system and method may perform faster (i.e., time-based) control of the EGR system. More specifically, the system and method may generate an EGR feedback value based on engine speed and a difference between desired and measured combustion phasing. The system and method may also generate an EGR feed-forward value based on a difference between desired and measured MAF rates. The system and method may then determine a desired position for an EGR valve based on the EGR feedback and feed-forward values, intake manifold absolute pressure (MAP), engine speed, and exhaust back pressure (EBP). Additionally, the system and method may command the EGR valve to the desired position (e.g., by generating a control signal for the EGR valve).

Figure 2:
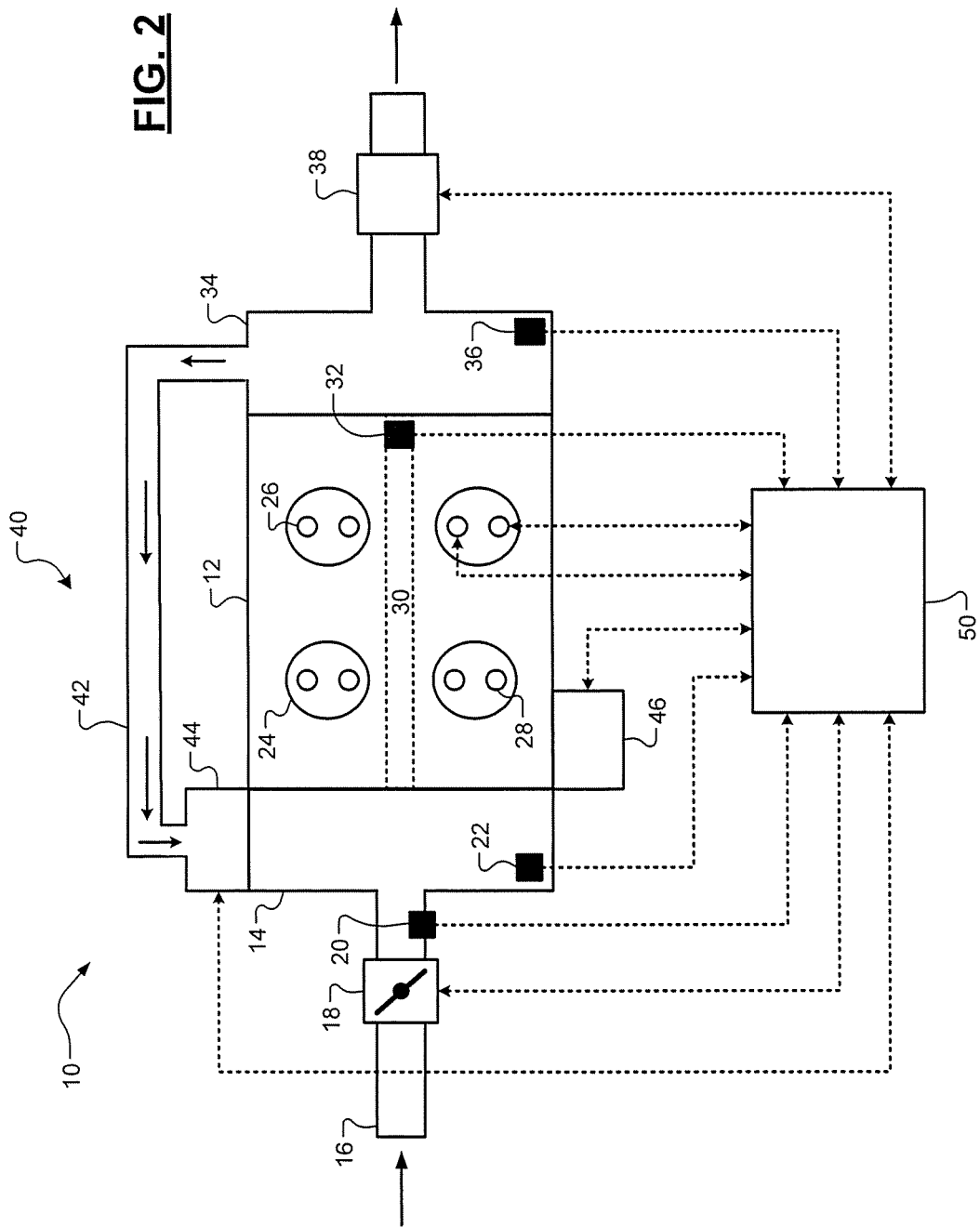
FIG. 2 is a functional block diagram of an exemplary engine system according to the present disclosure.

Referring now to FIG. 2, an engine system 10 includes an engine 12. For example, the engine 12 may be an HCCI engine. The engine 12 draws air into an intake manifold 14 through an inlet system 16 that may be regulated by a throttle 18. For example, the throttle 18 may be electronically controlled (e.g., electronic throttle control, or ETC). The inlet system 16, however, may also be unthrottled (e.g., some diesel engine systems). A MAF sensor 20 measures a rate of airflow into the intake manifold 14. An intake MAP sensor 22 measures a pressure of the air in the intake manifold 14.

The air in the intake manifold 14 may be distributed to a plurality of cylinders 24. While four cylinders are shown, other numbers of cylinders may be implemented. The air may be combined with fuel from fuel injectors 26 to form an air/fuel (A/F) mixture. The combustion drives the pistons (not shown) which rotatably turn a crankshaft 30 generating drive torque. An engine speed sensor 32 may measure a rotational speed of the crankshaft 30 (e.g., in RPM). The drive torque may be transferred from the crankshaft 30 to a driveline (not shown) (e.g., wheels) of a vehicle via a transmission (not shown). For example, the transmission (not shown) may be coupled to the crankshaft 30 via a torque converter (e.g., a fluid coupling).

Exhaust gas resulting from combustion may be expelled from the cylinders 24 into an exhaust manifold 34. An EBP sensor 36 may measure a pressure of exhaust gas in the exhaust manifold 34. An exhaust treatment system (ETS) 38 may treat the exhaust gas to decrease emissions before the exhaust gas is released into the atmosphere. For example, the ETS 38 may include at least one of an oxidation catalyst (OC), NOx absorbers/adsorbers, a selective catalytic reduction (SCR) catalyst, a particulate matter (PM) filter, and a catalytic converter (e.g., a three-way catalyst).

An EGR system 40 may introduce exhaust gas into the intake manifold 14. More specifically, the EGR system 40 may include an EGR line 42 that connects the exhaust manifold 34 to the intake manifold 14. An EGR pickup point on the exhaust manifold 34 may be before or after the ETS 38. The EGR system 40 may also include an EGR valve 44 that regulates an amount of EGR introduced into the intake manifold 14. For example, the EGR valve 44 may be electronically controlled. A turbocharger 46 (also referred to as "turbo 46") may further pressurize (i.e., boost) the air in the intake manifold 14. For example, a turbine (not shown) of the turbocharger 46 may be driven by exhaust gas from the exhaust manifold 34, which in turn powers a compressor (not shown) of the turbocharger 46 that pressurizes the air in the intake manifold 14.

A control module 50 may receive signals from the throttle 18 (e.g., throttle position), the MAF sensor 20, the MAP sensor 22, the fuel injectors 26, the spark plugs 28, the engine speed sensor 32, the EBP sensor 36, the ETS 38, and the EGR valve 44 (e.g., valve position). The control module 50 may also control the throttle 18 (e.g., ETC), the fuel injectors 26, the spark plugs 28, the ETS 38, and the EGR valve 44. The control module 50 may also implement the system or method of the present disclosure.

Figure 3:
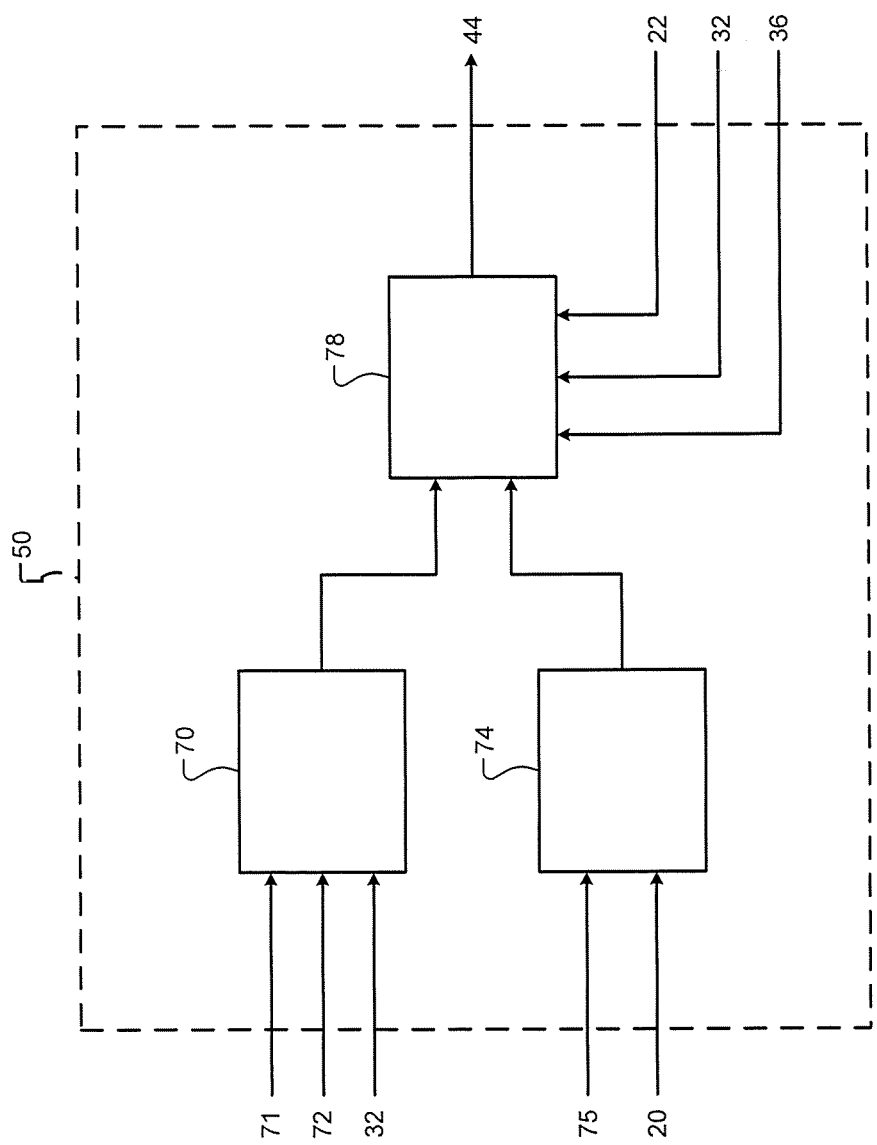
FIG. 3 is a functional block diagram of an exemplary control module according to the present disclosure.

Referring now to FIG. 3, the control module 50 is shown in more detail. The control module 50 may include a feedback determination module 70, a feed-forward determination module 74, and a valve control module 78. The control module 50 may also include memory (not shown) that stores various determined and/or predetermined parameters. For example, the memory (not shown) may include non-volatile memory (NVM).

The feedback determination module 70 receives signals 71, 72, and 32 indicating desired combustion phasing, measured combustion phasing, and engine speed, respectively. For example, the desired combustion phasing may be based on the engine load (e.g., MAF sensor 20), input from a driver of the vehicle (e.g., via an accelerator pedal), and/or engine speed. The measured combustion phasing or CA50, on the other hand, may be based combustion pressure measurements of the cylinders 24. The engine speed may be measured using the engine speed sensor 32.

The feedback determination module 70 may generate the EGR feedback value based on the received signals. More specifically, the feedback determination module 70 may generate the EGR feedback value (e.g., an EGR percentage) based on the engine speed and a difference between the desired combustion phasing and the measured combustion phasing. In other words, the EGR feedback value may correspond to a change in EGR position to adjust the measured combustion phasing to the desired combustion phasing. For example, the EGR feedback value may indicate EGR flow (e.g., in grams per second, or g/s).

The feed-forward determination module 74 receives signals 75 and 20 indicating desired MAF rate and measured MAF rate, respectively. For example, the desired MAF rate may be based on input from the driver of the vehicle (e.g., via an accelerator pedal). Additionally, for example, the measured MAF rate may be measured using the MAF sensor 20. The feed-forward determination module 74 generates the EGR feed-forward value based on the received signals. Similar to the EGR feedback value (described above), the EGR feed-forward value may indicate EGR flow (e.g., g/s). Alternatively, for example, the EGR feedback and feed-forward values may be referred to as first and second EGR feedback values, respectively. The feed-forward determination module 74 may generate the EGR feed-forward value based on a difference between the desired and measured MAF rates. For example, a lesser EGR position (e.g., less EGR) may be required when the measured MAF rate is less than the desired MAF rate.

The valve control module 78 receives the EGR feedback and feed-forward values from the feedback determination module 70 and the feed-forward determination module 74, respectively. The valve control module 78 also receives signals 22, 32, and 36 indicating MAP, engine speed, and EBP, respectively. For example, the MAP, the engine speed, and the EBP may be measured by the MAP sensor 22, the engine speed sensor 32, and the EBP sensor 36, respectively. The valve control module 78 may determine a desired position of the EGR valve 44 (e.g., opening percentage) based on the received signals. More specifically, the valve control module 78 may determine the desired position based on a sum of the EGR feedback and feed-forward values.

Moreover, however, the valve control module 78 may determine the desired position based on the MAP, the engine speed, and/or the EBP. For example, the desired position may increase when MAP increases, engine speed increases, and/or EBP decreases, and the desired position may decrease when MAP decreases, engine speed decreases, and/or EBP increases. In other words, the valve control module 78 may determine a base position based on the sum of the EGR feedback and feed-forward values and then adjust the base position based on the MAP, the engine speed, and the EBP (resulting in the desired position). Finally, the valve control module 78 may generate a control signal for the EGR valve 44 based on the desired position of the EGR valve 44.

Figure 4:
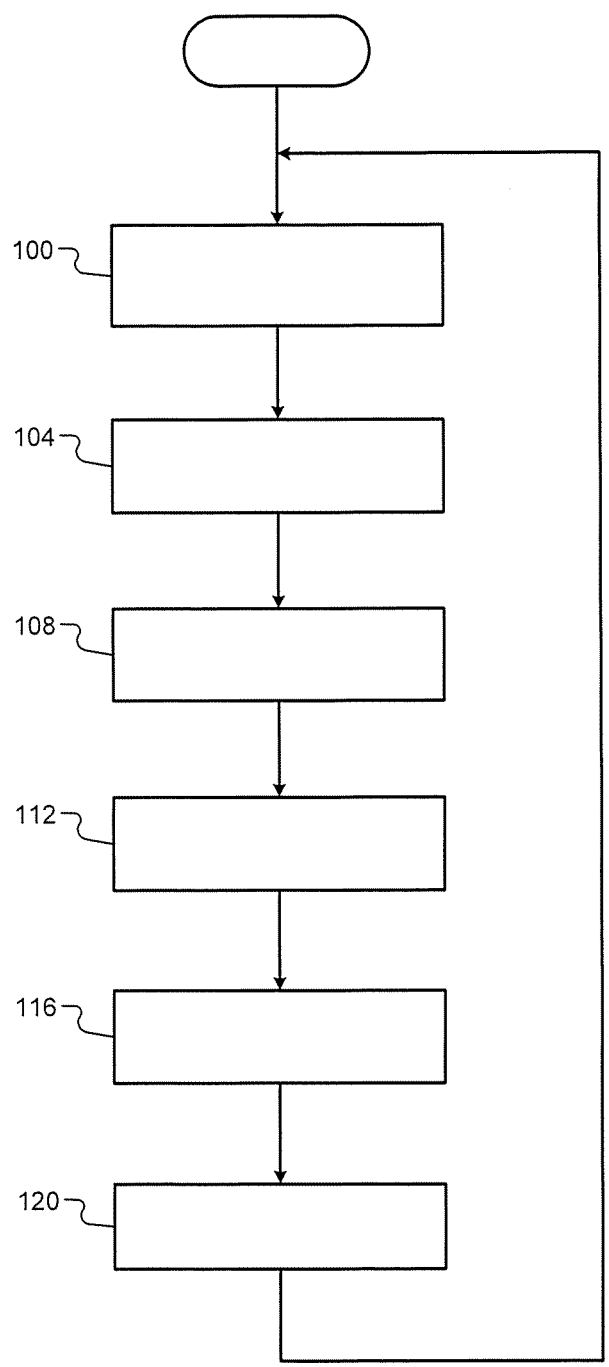
FIG. 4 is a flow diagram of an exemplary method for controlling an EGR system according to the present disclosure.

Referring now to FIG. 4, a method for controlling the EGR system 40 begins at 100. At 100, the control module 50 determines the desired combustion timing and the desired MAF rate. At 104, the control module 50 measures engine operating parameters (e.g., MAF, MAP, combustion phasing, engine speed, EBP, etc.).

At 108, the control module 50 generates the EGR feedback value based on the difference between the desired and measured combustion timings and engine speed. At 112, the control module 50 generates the EGR feed-forward value based on the difference between the desired and measured MAF rates.

At 116, the control module 50 determines the desired position for the EGR valve 44 based on the EGR feedback and feed-forward values, MAP, engine speed, and EBP. At 120, the control module 50 commands the EGR valve 44 to the desired position (e.g., by generating a control signal for the EGR valve 44). Control may then return to 100.

Figure 5:
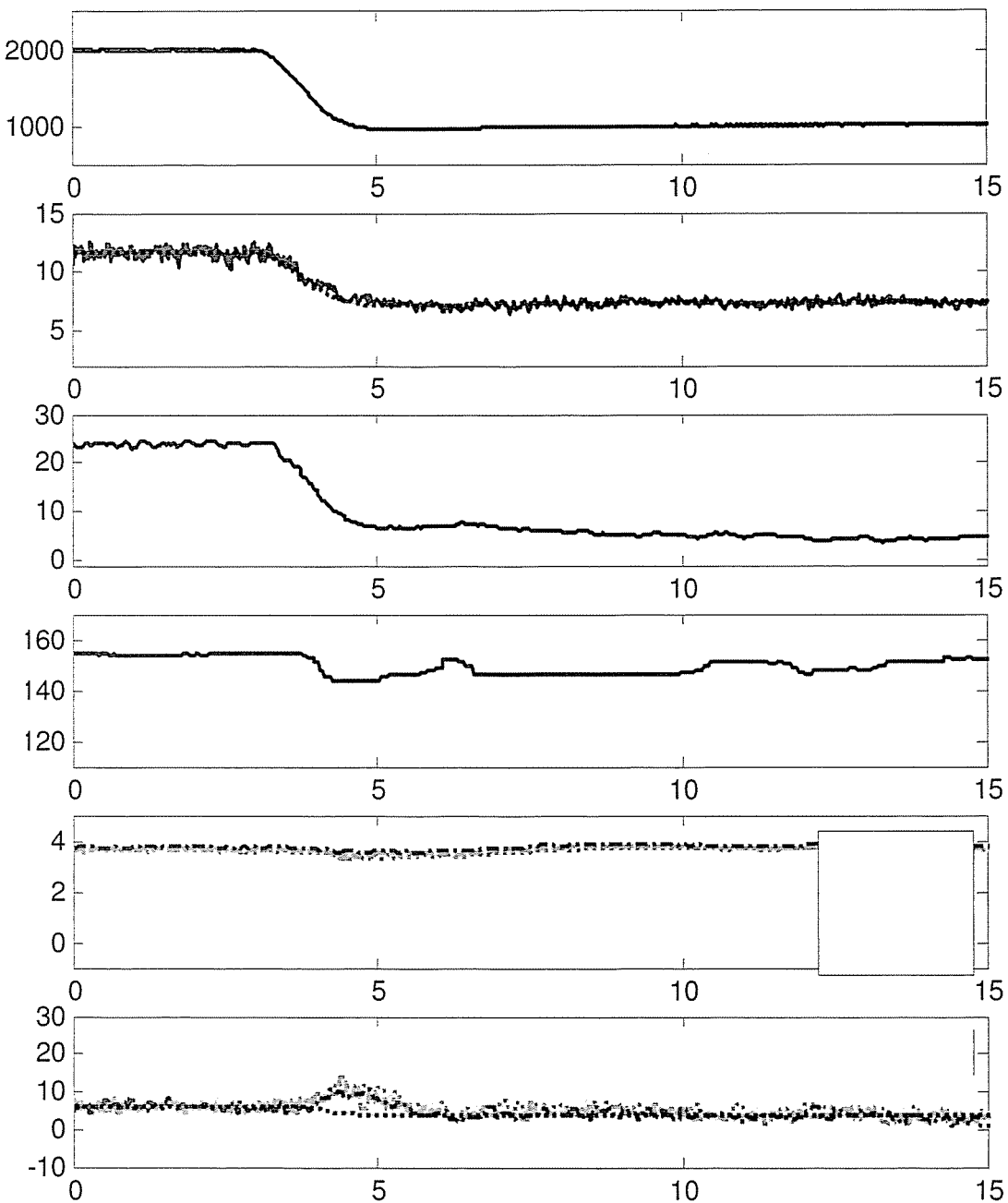
FIG. 5 is graphs illustrating exemplary results of controlling an EGR system according to the present disclosure.

Referring now to FIG. 5, exemplary results of the system and method of the present disclosure are shown. Specifically, six graphs are shown with respect to time (s) and from top to bottom represent engine speed (RPM), desired MAF rate (g/s), EGR valve position (opening %), NVO (CAD), IMEP (Bar), and CA50 (° ATDC), respectively. Similar to FIG. 1, engine speed rapidly decreases from approximately 2000 RPM to 1000 RPM. The system and method, however, control the EGR valve 44 more effectively (i.e., faster) than engine event-based (i.e., combustion event-based) control systems. Moreover, as shown, the improved control of the EGR valve 44 results in small NVO changes due to accurate EGR control and no combustion problems (e.g., misfires), as indicated by steady IMEP and CA50 characteristics.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system for an engine, comprising:
   a feedback determination module that generates an exhaust gas recirculation (EGR) feedback value based on engine speed and a difference between desired and measured combustion phasing;
   a feed-forward determination module that generates an EGR feed-forward value based on a difference between desired and measured mass air flow (MAF) rates; and
   a valve control module that controls an EGR valve based on the EGR feedback and feed-forward values, an intake manifold absolute pressure (MAP), the engine speed, and an exhaust back pressure (EBP).

2. The control system of claim 1, wherein the EGR feedback and feed-forward values each indicate an EGR flow rate.

3. The control system of claim 2, wherein the valve control module commands the EGR valve to a desired position, wherein the desired position is based on the MAP, the engine speed, the EBP, and a sum of the EGR feedback and feed-forward values.

4. The control system of claim 3, wherein the desired position increases when at least one of the engine speed increases, the MAP increases, and the EBP decreases.

5. The control system of claim 3, wherein the desired position decreases when at least one of the engine speed decreases, the MAP decreases, and the EBP increases.

6. The control system of claim 2, wherein the feed-forward determination module generates the EGR feed-forward value using a look-up table that includes a plurality of predetermined EGR feed-forward values based on engine load, the engine speed, the MAP, the EBP, and EGR valve position.

7. The control system of claim 1, wherein the desired combustion phasing is based on at least one of the measured MAF rate, driver input, and the engine speed.

8. The control system of claim 1, wherein the measured combustion phasing is based on at least one of in-cylinder combustion pressure measurements and a crank angle corresponding to a predetermined amount of combustion heat being released.

9. The control system of claim 1, wherein the engine includes a homogeneous charge compression ignition (HCCI) engine, and wherein the desired MAF rate is based on at least one of a combustion mode of the HCCI engine and driver input.

10. The control system of claim 9, wherein the EGR feedback and feed forward values are generated and the EGR valve is controlled during an HCCI combustion mode of the HCCI engine.

11. A method for controlling an engine, comprising:
    generating an exhaust gas recirculation (EGR) feedback value based on engine speed and a difference between desired and measured combustion phasing;
    generating an EGR feed-forward value based on a difference between desired and measured mass air flow (MAF) rates; and
    controlling an EGR valve based on the EGR feedback and feed-forward values, an intake manifold absolute pressure (MAP), the engine speed, and an exhaust back pressure (EBP).

12. The method of claim 11, wherein the EGR feedback and feed-forward values each indicate an EGR flow rate.

13. The method of claim 12, wherein controlling the EGR valve includes commanding the EGR valve to a desired position, wherein the desired position is based on the MAP, the engine speed, the EBP, and a sum of the EGR feedback and feed-forward values.

14. The method of claim 13, wherein the desired position increases when at least one of the engine speed increases, the MAP increases, and the EBP decreases.

15. The method of claim 13, wherein the desired position decreases when at least one of the engine speed decreases, the MAP decreases, and the EBP increases.

16. The method of claim 12, wherein generating the EGR feed-forward value includes using a look-up table that includes a plurality of predetermined EGR feed-forward values based on engine load, the engine speed, the MAP, the EBP, and EGR valve position.

17. The method of claim 11, wherein the desired combustion phasing is based on at least one of the measured MAF rate, driver input, and the engine speed.

18. The method of claim 11, wherein the measured combustion phasing is based on at least one of in-cylinder combustion pressure measurements and a crank angle corresponding to a predetermined amount of combustion heat being released.

19. The method of claim 11, wherein the engine includes a homogeneous charge compression ignition (HCCI) engine, and wherein the desired MAF rate is based on at least one of a combustion mode of the HCCI engine and driver input.

20. The method of claim 19, wherein generating the EGR feedback and feed-forward values and controlling the EGR valve occur during an HCCI combustion mode of the HCCI engine.

* * * * *